(12) United States Patent
Schmogrow (10) Patent No.: US 10,082,718 B2
(45) Date of Patent: Sep. 25, 2018

(54) NON-BLOCKING MACH-ZEHNDER MODULATOR ARM IMBALANCE MONITORING AND CONTROL THROUGH TONES

(71) Applicant: Infinera Corporation, Sunnyvale, CA (US)

(72) Inventor: Rene Marcel Schmogrow, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/382,203

(22) Filed: Dec. 16, 2016

(65) Prior Publication Data

US 2018/0173077 A1 Jun. 21, 2018

(51) Int. Cl.
*G02F 1/225* (2006.01)
*G02F 1/21* (2006.01)

(52) U.S. Cl.
CPC ...... *G02F 1/2255* (2013.01); *G02F 2001/212* (2013.01)

(58) Field of Classification Search
None
See application file for complete search history.

(56) References Cited

U.S. PATENT DOCUMENTS 9,166,697 B2 * 10/2015 Le Taillandier de Gabory ...........
G02F 1/0123

* cited by examiner

*Primary Examiner* — John M Bedtelyon
(74) *Attorney, Agent, or Firm* — David L. Soltz (57) ABSTRACT

A method and an apparatus for non-blocking Mach-Zehnder Modulator (MZM) arm imbalance monitoring and control through tones are disclosed herein. An optical transmitter may include an MZM to supply a first portion of light to an in-phase arm and a second portion to a quadrature arm of the MZM. The optical transmitter may apply modulator arm adjustments and dither signals to the two portions. Then, the MZM may combine the two portions into an optical output signal. The optical transmitter may tap the optical output signal to provide a first portion of the optical output signal and transmit a second portion. Also, the optical transmitter may obtain first error signals, based on the first dither signal, and second error signals, based on the second dither signal, of the first portion of the output signal. The optical transmitter may change the modulator arm adjustments based on the error signals.

22 Claims, 7 Drawing Sheets

Receiving light by a Mach-Zehnder Modulator (MZM) and supplying, by the MZM, a first portion of the light to the in-phase arm of the MZM and a second portion of the light to the quadrature arm of the MZM
381

Applying, by an electrical drive signal source, a first modulator arm adjustment and a first dither signal to the first portion of the light in the in-phase arm and a second modulator arm adjustment and a second dither signal to the second portion of the light in the quadrature arm
382

Combining, by the optical modulator, the first and second portions of the light from the in-phase arm and the quadrature phase arm, respectively, into an optical output signal
383

Tapping, by a splitter, the optical output signal to provide a first portion of the optical output signal and transmitting a second portion of the optical output signal to a communication system
384

Obtaining, by a first correlator, one or more first error signals based on the first dither signal of the first portion of the output signal, and one or more second error signals based on the second dither signal of the first portion of the optical output signal
385

Determining, by a processor, a first change to the first modulator arm adjustment based on the one or more second error signals and a second change to the second modulator arm adjustment based on the one or more first error signals
388

Providing, by the processor to the electrical drive signal source, the first change to first modulator arm adjustment and the second change to second modulator arm adjustment
389

NON-BLOCKING MACH-ZEHNDER MODULATOR ARM IMBALANCE MONITORING AND CONTROL THROUGH TONES

FIELD OF INVENTION

The disclosed embodiments are generally directed to interferometers. Specifically, the disclosed embodiments are directed to Mach-Zehnder Modulator (MZM) interferometers and related devices.

BACKGROUND

A Mach-Zehnder Modulator (MZM) interferometer is an extensively used type of interferometer. Interferometers are widely used in research and industrial applications to measure small displacements, refractive index changes and surface irregularities. An interferometer uses the interference of light waves to make precise measurements. The interferometer uses superposition to combine waves in a way that provides a meaningful property that may be diagnostic of the original state of the waves. For example, if two waves of the same frequency combine, their resulting intensity pattern is determined by the phase difference between the two waves. Accordingly, in-phase waves will undergo constructive interference and out of phase waves will undergo destructive interference when the waves are combined.

Typically, an interferometer will separate two waves and each wave will take a different path. A path difference, due to the different distances traveled by each wave, creates a phase difference between the waves. One of the paths may be used for diagnostic measurements. The waves are then recombined before arriving at a detector. Interferometers have many application, including in physics, astronomy, telecommunications, biology, medicine and seismology.

A MZM interferometer is more versatile than some other interferometers, including Michelson interferometers. In an MZM interferometer the light paths are well-separated and each light path is traversed only once. MZM interferometers have many applications, including in aerodynamics, quantum mechanics, plasma physics, heat transfer and telecommunications. In optical telecommunications, an MZM interferometer may be used as an electro-optic modulator for phase modulation of light as well as amplitude modulation of light.

SUMMARY

A method and an apparatus for non-blocking Mach-Zehnder Modulator (MZM) arm imbalance monitoring and control through tones are disclosed herein. In an example, an optical transmitter may include an MZM, which may receive light. The MZM may supply a first portion of the light to the in-phase arm of the MZM and a second portion of the light to the quadrature arm of the MZM. The optical transmitter may then apply a first modulator arm adjustment and a first dither signal to the first portion of the light in the in-phase arm, and a second modulator arm adjustment and a second dither signal to the second portion of the light in the quadrature arm. Then, the MZM may combine the first and second portions of the light from the in-phase arm and the quadrature arm, respectively, into an optical output signal. The optical transmitter may tap the optical output signal to provide a first portion of the optical output signal to circuits and transmit a second portion of the optical output signal to a communications system.

Also, the optical transmitter, using the circuits, may obtain first error signals based on the first dither signal of the first portion of the output signal, and second error signals based on the second dither signal of the first portion of the output signal. The optical transmitter may determine a first change to the first modulator arm adjustment based on the one or more second error signals and a second change to the second modulator arm adjustment based on the one or more first error signals. A dither signal may include one or more dither tones.

In an example, the optical transmitter may detect first characteristics of the obtained first error signals and second characteristics of the obtained second error signals. The optical transmitter may then determine the first change to the first modulator arm adjustment based on the detected second characteristics and the second change to the second modulator arm adjustment based on the detected first characteristics.

In an example, the first modulator arm adjustment may include applying the first change and applying the second modulator arm adjustment may include applying the second change. Further, applying the first change and applying the second change may be performed in a control loop.

In another example, the first modulator arm adjustment may be a first modulator arm phase adjustment. Also, the second modulator arm adjustment may be a second modulator arm phase adjustment. Further, the first modulator arm adjustment may be a first modulator arm amplitude adjustment. In addition, the second modulator arm adjustment may be a second modulator arm amplitude adjustment.

In a further example, the characteristics may include at least one of a minimum, a maximum and a null. Further, the characteristics may be determined based on at least one of first order harmonics, second order harmonics and amplitude modulated (AM) frequencies. In an additional example, the first modulator arm adjustment may be a first modulator arm adjustment drive signal and the second modulator arm adjustment may be a second modulator arm adjustment drive signal.

DETAILED DESCRIPTION OF THE EMBODIMENTS

An improved method of monitoring and controlling Mach-Zehnder Modulator (MZM) interferometer arm balance is disclosed herein. An optical transmitter may include an MZM. The MZM may split light into a first portion for an in-phase arm of the MZM and a second portion for a quadrature arm of the MZM. The optical transmitter may apply modulator arm adjustments and dither signals to the two portions. Then, the MZM may combine the two portions into an optical output signal. The optical transmitter may tap the optical output signal to provide a first portion of the optical output signal to circuits and transmit a second portion to a communications system. Also, the optical transmitter, using the circuits, may obtain first error signals based on the first dither signal of the first portion of the output signal, and second error signals based on the second dither signal of the first portion of the output signal. The optical transmitter may change the modulator arm adjustments based on the error signals.

In an example, the optical transmitter may detect characteristics of the error signals and determine changes to the modulator arm adjustments based on the characteristics. A dither signal may include one or more dither tones.

Specifically, examples disclosed herein include a method to determine and monitor a potential loss imbalance between the two arms of an MZM located, which may be referred to as a sub-MZM or a child MZM, within an outer MZM structure, which may be referred to as a super or parent MZM. The methods described herein are superior with respect to blocking arm by arm of the two inner MZMs, the child MZMs, within the super MZM because the methods do not require any blocking and are therefore potentially exercisable during normal operation. Also, examples disclosed herein do not suffer from changes induced by blocking and the implicated absorption of light which alters the energy state of the system.

Current incarnations and embodiments of sub-MZM structures and super-MZM structures typically provide a certain loss balance between arms only during the fabrication stage. As a result, there is no possibility of adjusting the loss balance after the MZM is built. Observing high loss imbalance may lead to a lower yield for the manufacturer. As integrated optics evolve and become more dominantly used, variable optical attenuators (VOAs) may be placed in each of the MZM paths. For example, 4 may be used per polarization and wavelength. These attenuators allow for blocking all but one path at a time and assessing the loss of each path individually. This blocking and assessing is typically done as part of a calibration and therefore set only once before deployment of the MZM. During normal operation, a recalibration causes the communication channel to go down and is thus not likely to be exercised.

Figure 1A:
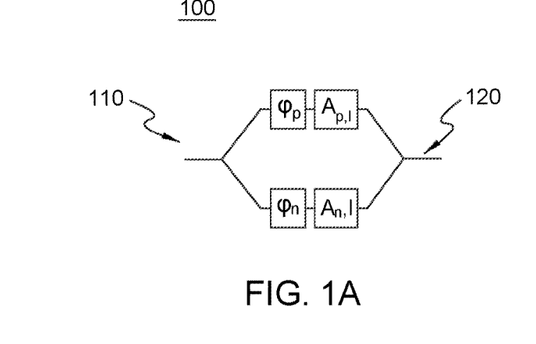
FIG. 1A is a schematic of an example Mach-Zehnder Modulator (MZM) interferometer used as an optical modulator.
Figure 1B:
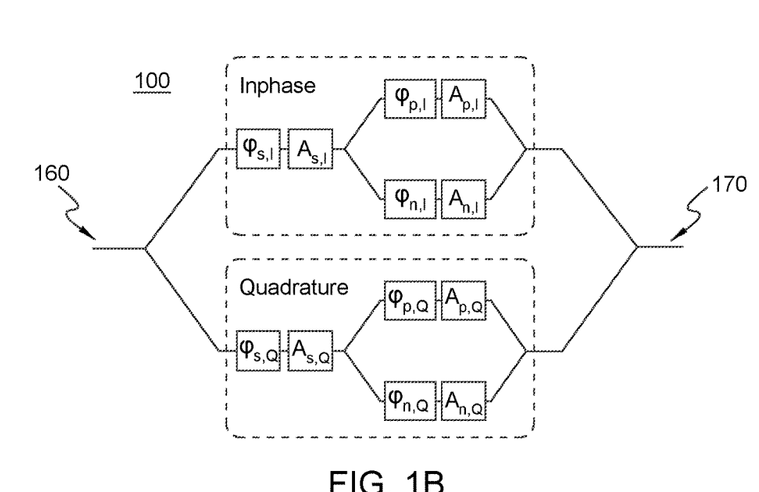
FIG. 1B is a schematic of an example of a nested MZM structure used to modulate complex signals onto an optical carrier.

FIG. 1A is a schematic of an example MZM interferometer used as an optical modulator. FIG. 1B is a schematic of an example of a nested MZM structure used to modulate complex signals onto an optical carrier. As shown in the schematics 100, the incoming light, which may be generated by a laser, may be split into two arms in each of which a phase shift may be applied. The incoming light may include optical field inputs 110, 160 which may be represented by $E_{in}$. The induced phases may be denoted as $\varphi_p$ and $\varphi_n$, respectively. The output light may include optical field outputs 120, 170 which may be represented by $E_{out}$.

In a usual MZM interferometer, there may be two phase shift elements per arm one of which is used to modulate a radio frequency (RF) signal and the other one is used to apply a direct current (DC) bias. This distinction is not shown in FIGS. 1A and 1B for the sake of simplicity but will be readily understood by those of ordinary skill in the art. In addition to the described phase adjusters there may be variable optical attenuators (VOA) located in some of or all of the optical paths. These VOAs are denoted as $A_p$ and $A_n$, respectively. By calibrating and adjusting the VOAs one can ensure that the optical loss in each of the two optical paths, as shown in FIG. 1A, or the four optical paths, as shown in FIG. 1B, is identical. The effects of loss imbalance is described further in subsequent sections herein.

In an example shown in FIG. 1A, the optical field input $E_{in}$ 110 at the MZM interferometer may be split into two arms (p and n) each of which may be applied with a phase shift cp. After the phase shift is applied, the two versions of the field may be combined to form the optical field output $E_{out}$ 120 of the MZM interferometer. In an example shown in FIG. 1B, the optical field input $E_{in}$ 160 may be split into In-phase (I) and Quadrature (Q) arms, which each may then be split into two arms (p and n). These four paths may then be combined to form the optical field output $E_{out}$ 170 of the MZM interferometer.

The transfer function of the MZM structure shown in FIG. 1A can be described by the following equation:

$$\frac{E_{out}}{E_{in}} = \frac{1}{2}[e^{j\varphi_p} - e^{j\varphi_n}] \qquad \text{Equation (1)}$$

In the present example, one may assume that a difference output port may be used and that there is identical loss (for example, A=1) in each of the paths. Equation (1) may be further rewritten as follows:

$$\frac{E_{out}}{E_{in}} = je^{j\frac{\varphi_p+\varphi_n}{2}} \sin\frac{\varphi_p-\varphi_n}{2} \qquad \text{Equation (2)}$$

If the two splitters in the MZM structure, however, are imbalanced or if there is more insertion loss in one of the paths (p or n), then the following equation may describe the relation between input $E_{in}$ 110, 160 and output $E_{out}$ 120, 170 in a more generalized form:

$$\frac{E_{out}}{E_{in}} = \frac{1}{2}[A_p e^{j\varphi_p} - A_n e^{j\varphi_n}] \qquad \text{Equation (3)}$$

Expressing what may be referred to as the arm imbalance by $\Delta A = A_p - A_n$, Equation (3) becomes the following:

$$\frac{E_{out}}{E_{in}} = \frac{1}{2}[(A_n + \Delta A)e^{j\varphi_p} - A_n e^{j\varphi_n}] = \qquad \text{Equation (4)}$$
$$\frac{1}{2}[A_n e^{j\varphi_p} - A_n e^{j\varphi_n} + \Delta A e^{j\varphi_p}]$$

Further, assuming that $A_n=1$ in an example without loss of generality:

$$\frac{E_{out}}{E_{in}} = je^{j\frac{\varphi_p+\varphi_n}{2}}\sin\frac{\varphi_p-\varphi_n}{2} + \frac{\Delta A}{2}e^{j\varphi_p}e^{j\frac{\varphi_p+\varphi_n}{2}} \qquad \text{Equation (5)}$$

In an example, if the MZM interferometer is operated in push-pull mode, as is normally done, then $\varphi_p=-\varphi_n$, which from now on may be denoted as $\varphi_p=\phi$, and the equation simplifies to the following:

$$\frac{E_{out}}{E_{in}} = j\sin\phi + \frac{\Delta A}{2}e^{j\phi} \qquad \text{Equation (6)}$$

One can see that an MZM arm imbalance may create an optical field with constant amplitude or carrier with a 90 degree or $\pi/2$ phase with respect to the signal. In a nested or super MZM structure, as shown in FIG. 1B, this residual carrier may be compensated using a phase bias set in the other quadrature. For example, if there is an imbalance in the I sub MZM structure, the overall carrier (or unmodulated optical field) can still be suppressed by adjusting the phase shifters in the Q sub MZM structure. The following equation shows the transfer function for a super MZM structure:

$$\frac{E_{out}}{E_{in}} = \left[j\sin\phi_I + \frac{\Delta A_I}{2}e^{j\phi_I}\right] + e^{-j\phi_{IQ}}\left[j\sin\phi_Q + \frac{\Delta A_Q}{2}e^{j\phi_Q}\right] \qquad \text{Equation (7)}$$

Assuming that that the super MZM structure angle $\phi_{IQ}$ is set to 90 degrees (or $\pi/2$), the equation simplifies to the following:

$$\frac{E_{out}}{E_{in}} = [j\sin\phi_I + \sin\phi_Q] + \frac{\Delta A_I}{2}e^{j\phi_I} + j\frac{\Delta A_Q}{2}e^{j\phi_Q} \qquad \text{Equation (8)}$$

Both terms $$\frac{\Delta A_I}{2}e^{j\phi_I} \text{ and } j\frac{\Delta A_Q}{2}e^{j\phi_Q}$$

may lead to an optical field that is not fully suppressed at $\phi=0$ and can therefore be referred to as carrier leakage. State of the art optical modulators are phase controlled. In the case of non-zero carrier leakage, a phase control loop may adjust the phase bias $\phi$ of I and Q MZMs until the terms $$\frac{\Delta A_I}{2}e^{j\phi_I} \text{ and } j\frac{\Delta A_Q}{2}e^{j\phi_Q}$$

vanish. However, compensating for arm imbalance in one of the sub MZMs by adjusting the phase bias in the opposite MZM arm, comes at a price of increased MZM non-linearity.

Figure 2:
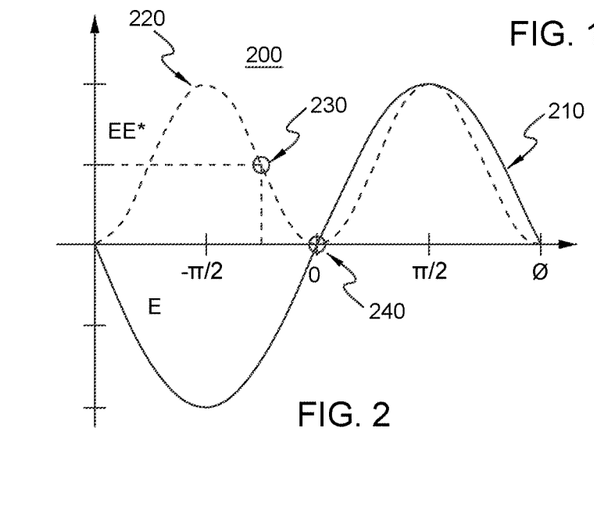
FIG. 2 is a graph of an example of field and intensity transfer functions of an ideal MZM structure.

FIG. 2 is a graph of an example of field and intensity transfer functions of an ideal MZM structure. Graph 200 shows the transfer function of an ideal, arm balanced MZM modulator, such as that in the MZM in FIG. 1A, with respect to the optical field 210 and the optical power or intensity 220, which may be represented by EE*. FIG. 2 shows an example of an MZM transfer function under push-pull operation. In an example, if an arm (or loss) imbalance in the opposite arm was to be compensated through tuning the phase $\phi$, the MZM may be operated at a point shifted from a point 240, which may be referred to as a Null Point, and hence a signal may experience more non-linear distortion. The optical power or intensity transfer function may include a quadrature point 230 as the operating point of the super MZM structure. In summary, although arm imbalances can be compensated for by phase control, this compensation comes at the prize of degraded performance due to an increase in non-linear distortions.

In order to obtain the best possible performance, a goal may be to adjust the 4 arms of a nested MZM structure so that they are well power balanced as part of a calibration process. Another goal may be to track degradation while the modulator is deployed in the field. Assuming a laser light source at the input, blocking all modulator arms one by one and measuring the optical power at the output may only serve as an initial set point for power balance but cannot be done in the field without bringing data traffic down. Furthermore, blocking the light in individual arms may heat up the modulator locally which may change the overall bias conditions through thermal crosstalk. Therefore, an accurate and efficient method would improve calibrating and tracking MZM arm imbalances without the need to block individual arms.

One of ordinary skill in the art will understand that the methods described herein may be performed on a variety of devices. The devices described herein are for illustrative purposes and the methods may be performed on other devices known to one of ordinary skill in the art without loss of functionality. In an example, the methods described herein may be performed on an optical modulator. The optical modulator may be an MZM. Further, the methods described herein may be performed in the digital domain or the analog domain, or a combination of the digital and analog domains.

Figure 3A:
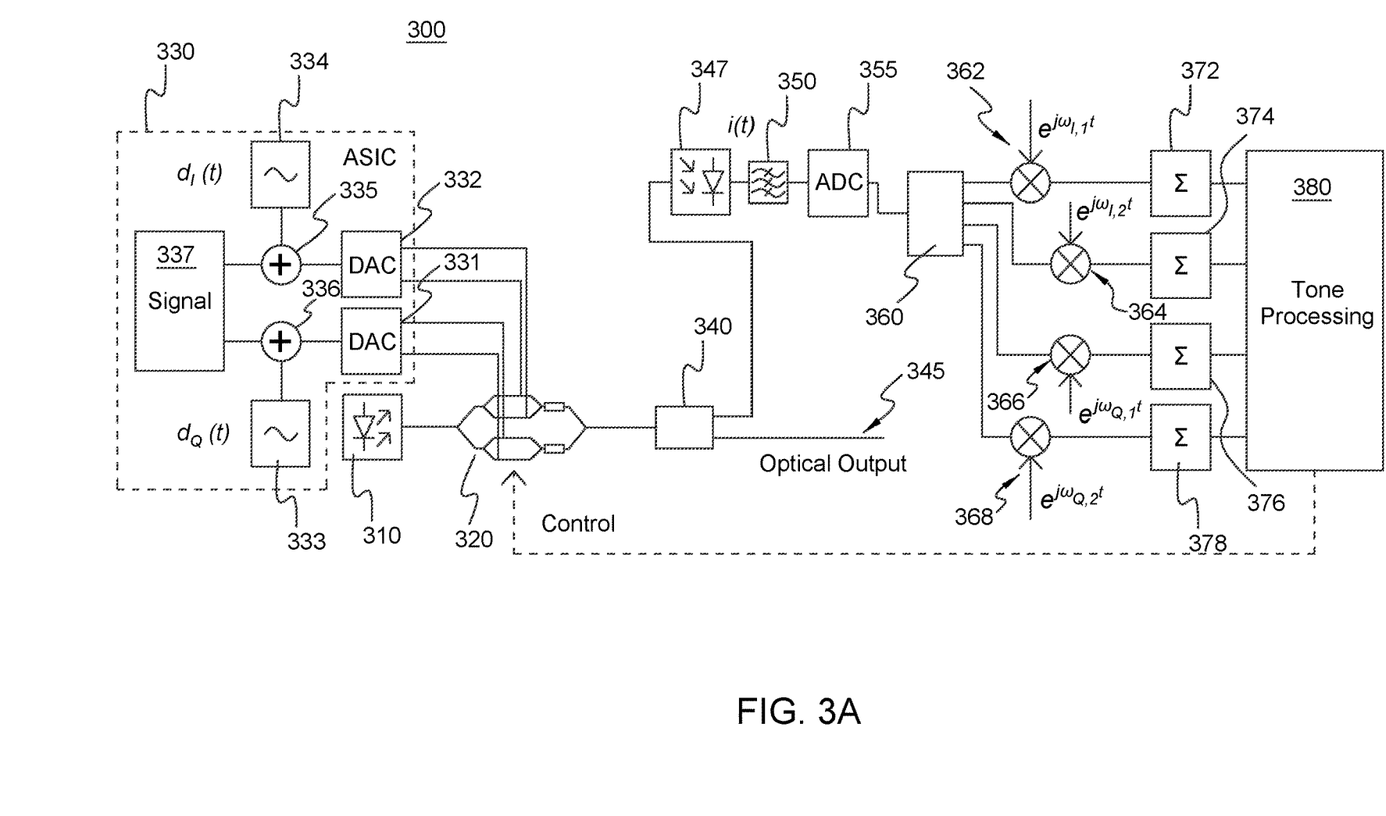
FIG. 3A is a diagram of an example of a sub MZM arm imbalance detection and calibration assembly.

FIG. 3A is a diagram of an example of a sub MZM arm imbalance detection and calibration assembly. Diagram 300 shows a potential setup that can be used to detect sub MZM arm imbalance and may be an optical transmitter. Signals, which may be referred to as dither signals, may be added to the transmitted signal and detected locally, such as at the transmitter. A dither signal may include one or more dither tones.

In an example shown in FIG. 3A, a light source 310, which may be a laser source, such as a laser diode, may generate an optical field MZM input for an optical modulator or an MZM structure 320, which may be similar to the MZM structure shown in FIG. 1A, the nested MZM structure shown in FIG. 1B or another MZM structure. A signal for transmission, which may be a high speed RF signal, may be generated by a signal generator 337. The signal for transmission may include a payload or data signal. Dither tones 333, 334 may then be added to the signal at junctions 335, 336 and fed into digital to analog converters (DACs) 331, 332. This processing may occur within an application specific integrated circuit (ASIC). The DACs may then produce analog signals which are used by the MZM structure 320. In an example, the dither tones may be added at other points and not only at the ASIC. For example, the dither tones may be added at the output of the DACs. In another example, the dither tones may be added to the DC voltage applied to the DC phase adjustors of the MZM, as described herein below. The dither tones may be added to the DC phase adjustors in the analog domain. The dither tones may also be added by electrical drive signal source sources, in an example.

The MZM may send an optical field output, which may be denoted as E(t) to optical splitter 340. Optical splitter 340 may split the optical signal into optical output 345 and a signal used to detect the dither signals and determine the arm imbalance. In an example, 90% of the signal from optical splitter 340 may be optical output 345 and 10% may be used for detection, however other percentages may be used without loss of functionality.

The dither signals may be detected using a single low-speed photo detector 347. The arm imbalance may then be determined based on the dither signals, as explained more fully herein. In an example, photo detector 347 may include a photo diode and a trans-impedance amplifier. Photo detector 347 may generate an electrical signal as output, which may be represented by i(t) and fed into a low pass filter 350. The output of low pass filter 350 may be input into an analog to digital converter (ADC) 355 and be subject to and digital signal processing (DSP). The output of ADC 355 may be fed into splitter 360, which may split the signal into four signals and output each of the four signals into one of four different respective correlators. In an example, the correlators may be circuits. Each correlator may include multipliers and accumulators for real and imaginary parts of the signal. For example, a first correlator may include complex multiplier 362 and accumulator 372, a second correlator may include complex multiplier 364 and accumulator 374, a third correlator may include complex multiplier 366 and accumulator 376 and a fourth correlator may include complex multiplier 368 and accumulator 378. Correlators may provide outputs for use by tone processing 380, which may detect and process the dither tones 333, 334 used in MZM structure 320. In example, the correlators may also include splitter 360. In a further example, a dither detection and processing device may perform some or all of the steps performed by, or include some or all of, the following components: the photo detector 347, the low pass filter 350, the splitter 360, complex multipliers 362, 364, 366, 368, accumulators 372, 374, 376, 378 and tone processing 380.

The tone processing 380 may be performed by a variety of devices or components. For example, tone processing 380 may be performed by a processor. The processor may be an analog processor or a digital processor. Further, the processor may be a microprocessor, a microcontroller, a processing unit or a field-programmable gate array (FPGA). In an example, the tone processing 380 may be performed external to or remote from the optical transmitter. In an example, tone processing 380 may provide instructions to the attenuators to adjust the attenuation.

As noted above, the dither tones may either be added digitally within an ASIC. In another example, the dither tones may be added as analog electrical tones either to the RF signal or they are added to the DC signals fed to the MZM DC electrodes used to set the MZM phase bias. In an example, the dither tones may be added to the RF signal using a bias tee or a diplexer, which may include a capacitor and an inductor. Applying a dither signal may be considered to be applying a periodic variation to a constant.

As an example and without losing generality the dither signals $d_I$ 334 and A 333 may be added digitally and fed to DACs 332, 331 together with the high speed signal 337. This is a common setup that may already be in place to perform phase control of the optical IQ modulator. The outputs of DACs 332, 331 may be used to drive a nested MZM structure 320. Although not shown in FIG. 3A to avoid redundancies, the processing may include a potential second polarization. Individual signals may be carried on the I and Q quadratures, each of which can be a differential signal with p and n physical paths. While in general $s_I(t) \neq s_Q(t)$ the following may hold: $s_{I,Q,n}(t) = -s_{I,Q,p}(t)$ to ensure push-pull operation of the MZMs. The optical output of the modulator may be tapped, detected and digitized, as described herein. Again, the processing could have been performed in the analog domain as well. A set of four correlators may be needed to detect frequencies associated with the tones $d_I$ and $d_Q$.

Tone processing as described in more detail herein may produce signals, which may be referred to as error signals, that may be used to control the respective arm loss in the nested MZM structure through, for example, VOAs. VOAs are commonly used in integrated optical modulator structures to tolerate a certain distribution of splitting ratios and insertion loss.

Figure 3B:
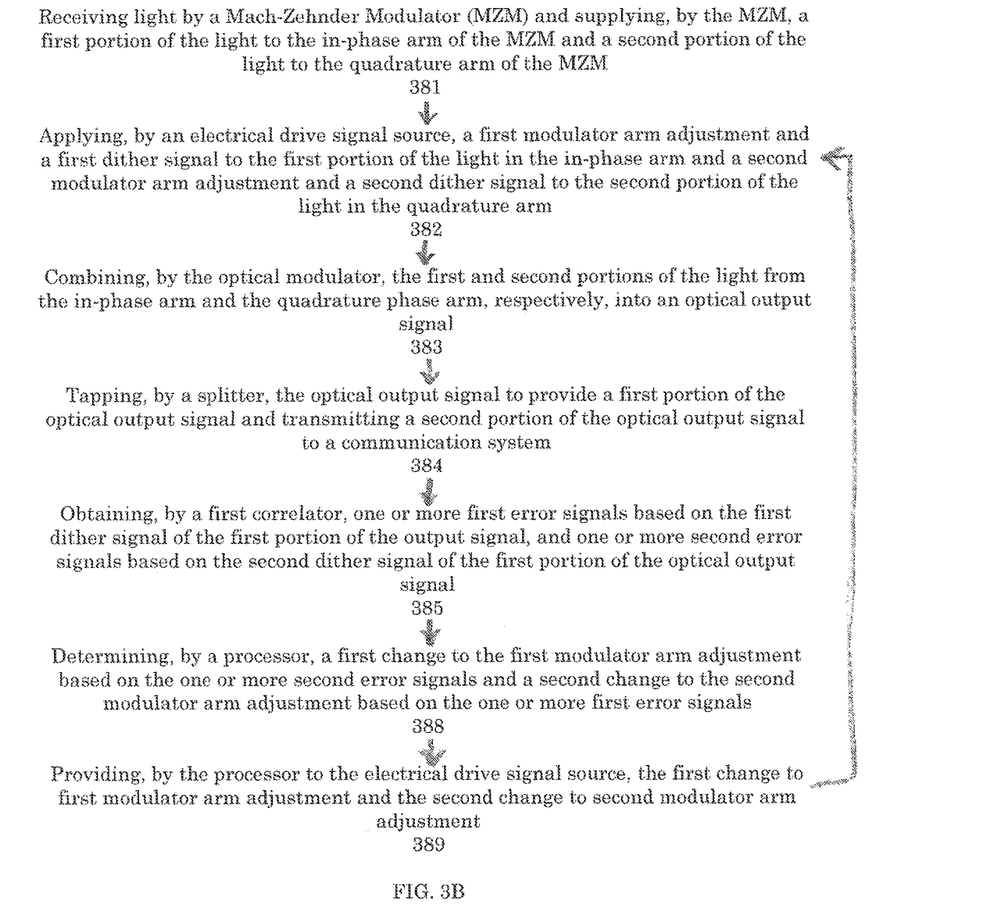
FIG. 3B is a diagram of an example of a sub MZM arm imbalance detection and calibration flowchart.

FIG. 3B is a diagram of an example of a sub MZM arm imbalance detection and calibration flowchart. In an example shown in FIG. 3B, an optical modulator may split an optical field input into portions. Light may be considered to be an optical field input. The optical modulator may be an MZM. Specifically, the MZM may receive light and then supply a first portion of the light to the in-phase arm of the MZM and a second portion of the light to the quadrature arm of the MZM 381. An electrical drive signal source may apply a first modulator arm adjustment and a first dither signal to the first portion of the light in the in-phase arm and a second modulator arm adjustment and a second dither signal to the second portion of the light in the quadrature arm 382. A dither signal may include one or more dither tones. The dither signals may include AM dither tones. Further, in an example, the first modulator arm adjustment may be a first modulator arm adjustment drive signal and the second modulator arm adjustment may be a second modulator arm adjustment drive signal The MZM may then combine the first and second portions of the light from the in-phase arm and the quadrature phase arm, respectively, into an optical output signal 383. Then, a splitter may tap the optical output signal to provide a first portion of the optical output signal to first and second correlators (which may be circuits), and may transmit a second portion of the optical output signal to a communication system 384. Further, a first correlator may obtain one or more first error signals based on the first dither signal of the first portion of the output signal, and one or more second error signals based on the second dither signal of the first portion of the optical output signal 385. In an example, the first correlator may be a first circuit and the second correlator may be a second circuit.

A processor may determine a first change to the first modulator arm adjustment based on the one or more second error signals and a second change to the second modulator arm adjustment based on the one or more first error signals 388. Further, the processor may provide, to the electrical drive signal source, the first change to first modulator arm adjustment and the second change to second modulator arm adjustment 389. The electrical drive signal source may then apply these changes in a manner similar to that described above. The above components of the optical transmitter may be operatively connected to each other.

In addition, applying the first change and applying the second change may be performed in a control loop. The control loop may run on a continuous, iterative basis.

In a further example, the processor of the optical transmitter may detect first characteristics of the obtained first error signals and second characteristics of the obtained second error signals. The processor may then determine the first change to the first modulator arm adjustment based on the detected second characteristics and the second change to the second modulator arm adjustment based on the detected first characteristics.

In another example, the first modulator arm adjustment may be a first modulator arm phase adjustment. Also, the second modulator arm adjustment may be a second modulator arm phase adjustment. Further, the first modulator arm adjustment may be a first modulator arm amplitude adjustment. In addition, the second modulator arm adjustment may be a second modulator arm amplitude adjustment.

In a further example, the characteristics may include at least one of a minimum, a maximum and a null. Further, the characteristics may be determined based on at least one of first order harmonics, second order harmonics and amplitude modulated (AM) dither tones. The characteristics of the first order harmonics, second order harmonics and AM dither tones are described more fully herein below.

A variety of different dither signals or tones may be applied an example of which is shown in the following. A tone or dither signal may be defined by the following equation:

$$d_{I,Q}(t) = A \cos \omega_{I,Q} t \quad \text{Equation (9)}$$

The dither tone of Equation (9) may be applied as dither tone 334. In an example, a correlator processing the digitized photo current using $\omega_{I,Q}$ as its frequency may produce the following output:

$$x_{\omega_{I,Q}}(\phi) = A \sin 2\phi \quad \text{Equation (10)}$$

In Equation (10), A may be the tone amplitude and $\phi$ be the sub MZM phase. The described dither and error signals are usually used and observed in current MZM phase controls. Therefore no complexity may be added by the sub MZM balance control scheme up to this point.

Figure 4A:
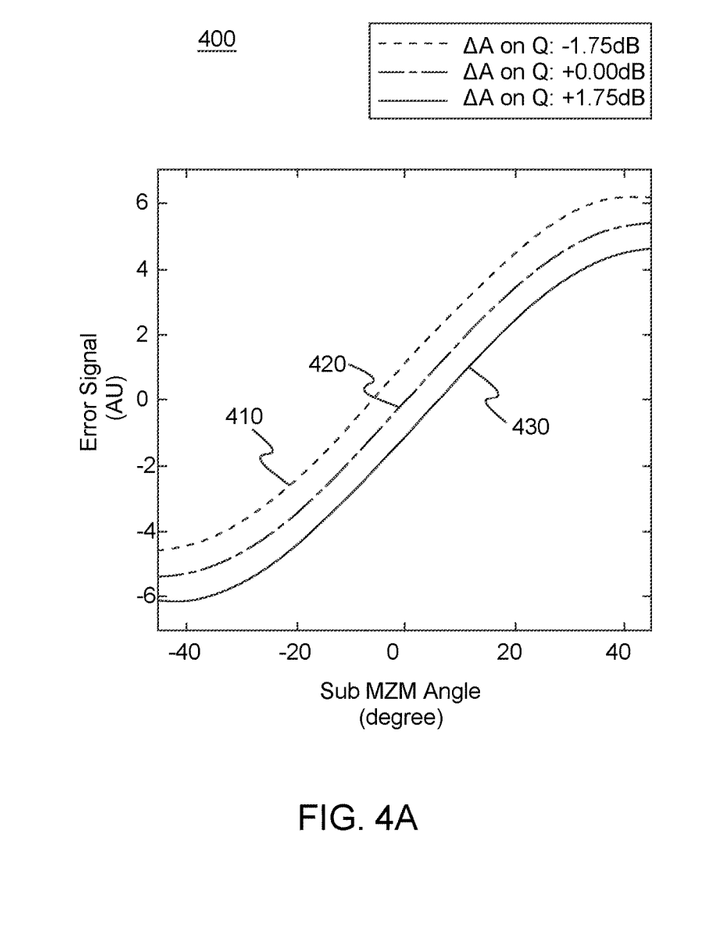
FIG. 4A is a graph of an example of a first order harmonic of phase error signals monitored on the In-phase (I) arm for different Quadrature (Q) sub MZM arm imbalances.

FIG. 4A is a graph of an example of a first order harmonic of phase error signals monitored on the In-phase (I) arm for different Quadrature (Q) sub MZM arm imbalances. A graphical interpretation of Equation (10) is shown in FIG. 4A for the detection of error signals on the I quadrature and for different arm imbalances $\Delta A$ in the Q quadrature. In an example shown in graph 400, an arm imbalance in the Q sub MZM may lead to a vertical shift of the phase error signal in the I sub MZM, as observed by a state of the art phase control. For example, moving from a $\Delta A$ of +1.75 decibels (dB) in the Q quadrature, shown by line 430, to a $\Delta A$ of +0.00 dB in the Q quadrature, shown by line 420, may lead to a vertical shift of the phase error signal in the I sub MZM. A further moving from a $\Delta A$ of +0.00 dB in the Q quadrature, line 420, to a $\Delta A$ of −1.75 decibels (dB) in the Q quadrature, shown by line 410 may lead to a further vertical shift of the phase error signal in the I sub MZM. The same may apply if I and Q were to be switched.

In an example, a phase control loop may result in a sub MZM phase at which the error signal is zero. This example may coincide with the actual Null Point, in other words, with the sub MZM angle of $\phi=0$, if there is no arm imbalance in the opposite quadrature ($\Delta A=0$). If one could know the difference between the actual Null Point $\phi=0$ and the sub MZM phase at which the error signal becomes zero, a sub MZM arm imbalance can be determined. While the first order frequency $\omega_{I,Q}$ amplitude may be proportional to the sine of twice the sub MZM phase, the amplitude of the second order harmonic $2\omega_{I,Q}$ may be proportional to the cosine of the same, according to the following equation:

$$x_{2\omega_{I,Q}}(\phi) \sim \cos 2\phi \quad \text{Equation (11)}$$

Figure 4B:
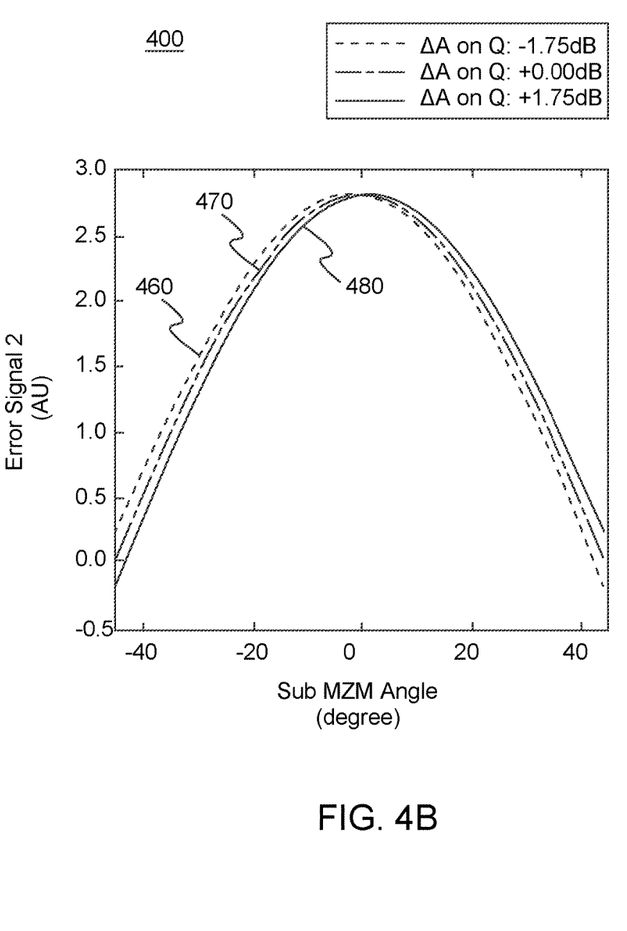
FIG. 4B is a graph of an example of a second order harmonic of phase error signals monitored on the I arm for different Q sub MZM arm imbalances.

FIG. 4B is a graph of an example of a second order harmonic of phase error signals monitored on the I arm for different Q sub MZM arm imbalances. FIG. 4B shows a graphic interpretation of Equation (11) for the detection of error signals on the I quadrature for the same different arm imbalances $\Delta A$ in the Q quadrature (460, 470, 480) as shown in FIG. 4A (410, 420, 430). As shown in FIG. 4B, the arm imbalance $\Delta A$ induced shift of the phase error curve may be much weaker for the second order harmonic than for the first order result. With this difference in shift, an error signal for $\Delta A$ may be obtained by comparing the locations of first order harmonic zero in FIG. 4A and the second order harmonic maximum in FIG. 4B.

These phases $\phi$ may be assessed by slightly varying the sub MZM phase which may be done without significantly impacting the transmitted signal. Hence, the described method may be a candidate to be used for active in-service sub MZM arm balance monitoring and control. Instead of looking at the second order harmonic, an AM tone may be added. This is another variant of the proposed scheme which may provide greater flexibility in choosing a second frequency for both dither and correlator. The AM tone may be defined by the following equation:

$$d_{AM}(t) = A \left[ \frac{1 + m\cos(\omega_{AM} t)}{2} \right] \cos(\omega_c t) \quad \text{Equation (12)}$$

In Equation (12), in may be the modulation index, A may be the amplitude, $\omega_{AM}$ may be the AM frequency, and $\omega_c$ may be the carrier frequency. Instead of assessing the second order harmonic, one may assess $\omega_{AM}$ instead. The rest may be identical to what is described above herein.

Alternatively, if a full sub MZM phase sweep can be performed, for example, during a calibration, the absolute value of the first order sub MZM phase error signal can be looked at. Essentially this is the same signal shown in FIG. 4A with an additional sign removal by looking at the absolute value.

Figure 5:
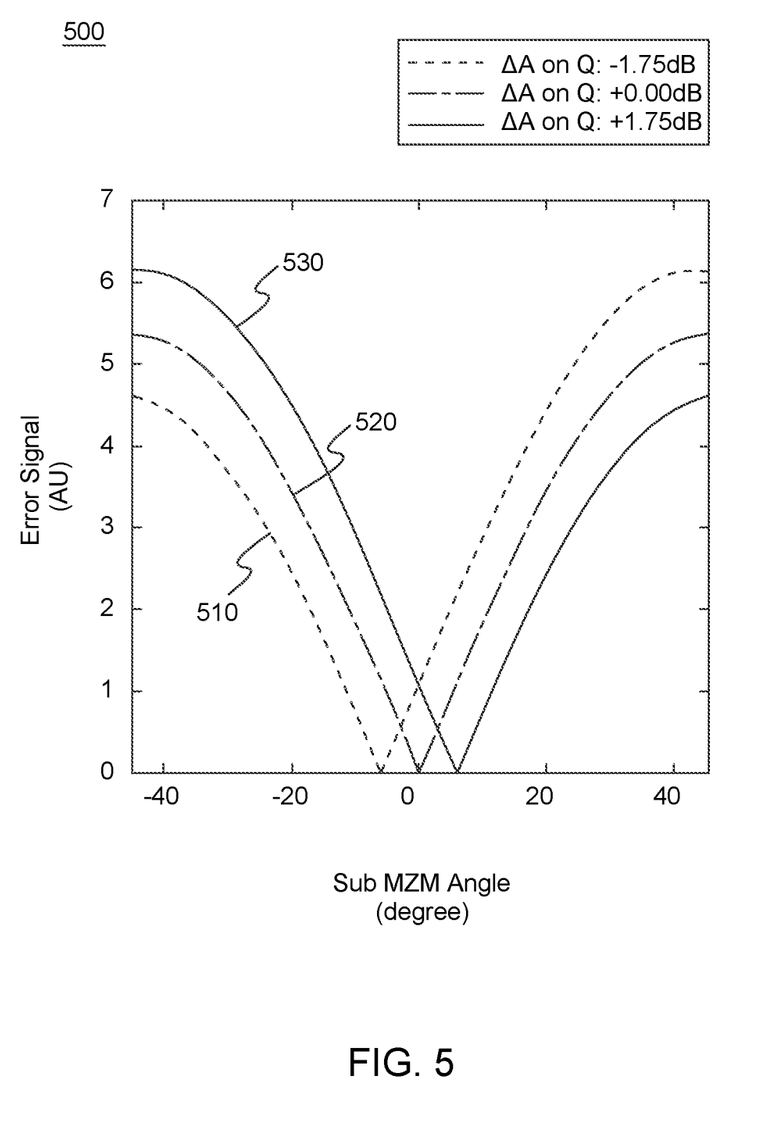
FIG. 5 is a graph of an example of the absolute values of phase error signals monitored on the I arm for different Q sub MZM arm imbalances.

FIG. 5 is a graph of an example of the absolute values of phase error signals monitored on the I arm for different Q phase arm sub MZM imbalances. FIG. 5 may be considered as an absolute value of error signal detection analog to FIG. 4A. As shown in graph 500, by comparing the maximum value seen for $\phi<0$ to the maximum value seen for $\phi>0$, the sub MZM arm imbalance in the opposite arm may be quantified. For this method no assessment of the second order harmonic may be required and a single dither may suffice per sub MZM.

To illustrate the functionality of the described methods, simulations have been carried out for several combinations of sub MZM arm imbalances on I and Q, in other words, by sweeping $\Delta A$. The arm imbalance on Q is investigated through phase error signals obtained on I. The phase settings on Q are set to minimize the phase error signal on Q as a phase feedback loop would do in a real system.

Figure 6A:
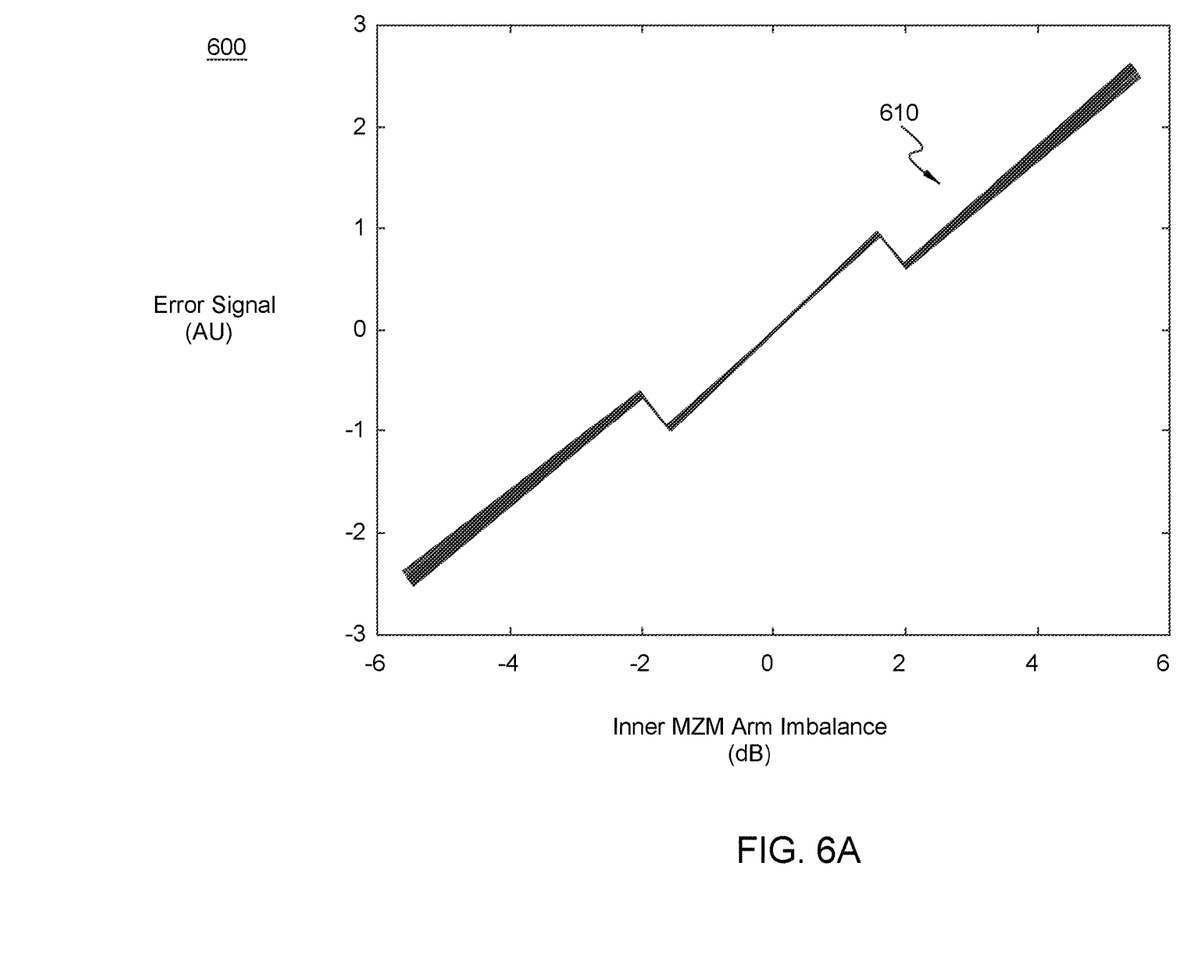
FIG. 6A is a graph of an example of obtained error signals by sweeping different sub MZM arm imbalances.

FIG. 6A is a graph of an example of obtaining error signals by sweeping different sub MZM arm imbalances. In an example shown in FIG. 6A, the error signals 610 in graph 600 may be obtained by determining the difference between the $\phi$ at which the phase error signal equals 0 in the first order harmonic, per FIG. 4A, and the $\phi$ at which the error signal is at its maximum in the second order harmonic, per FIG. 4B.

Figure 6B:
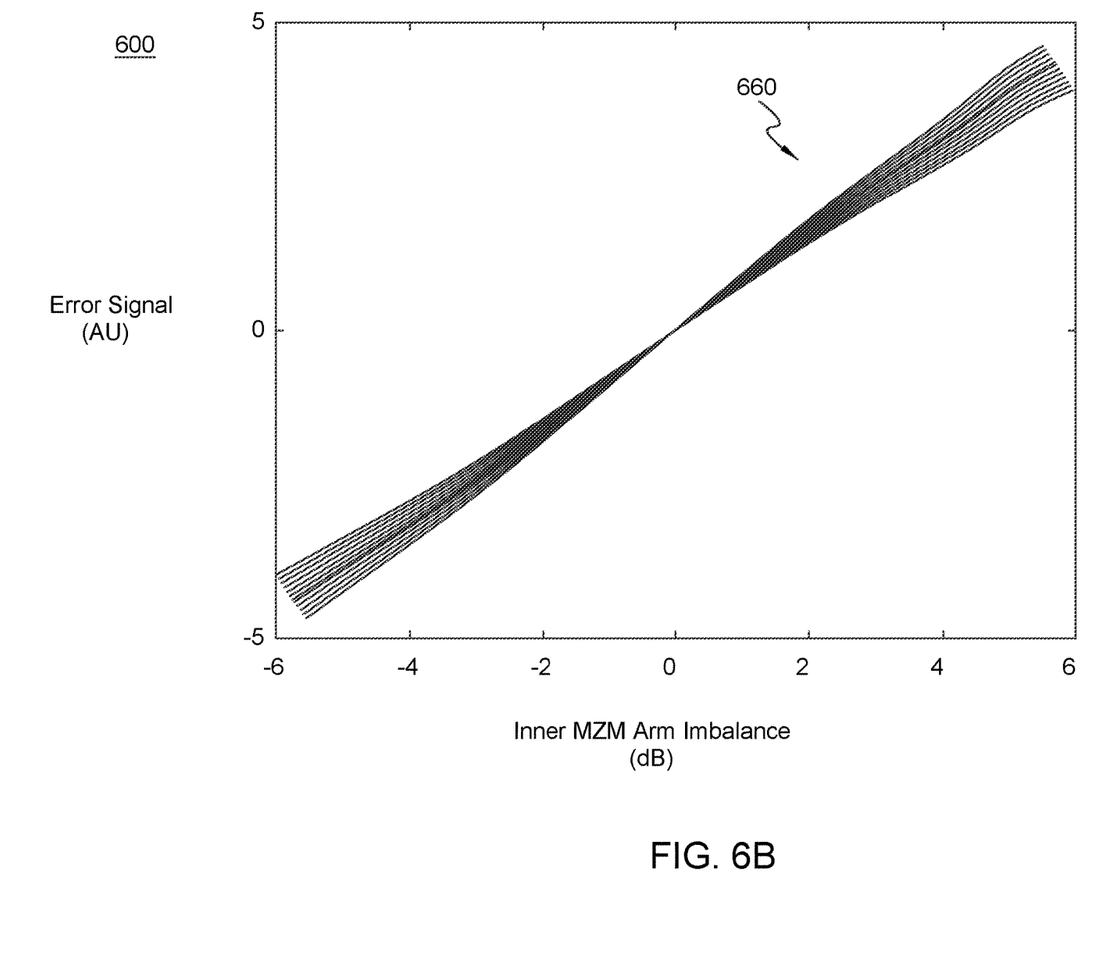
FIG. 6B is a graph of another example of obtained error signals by sweeping different sub MZM arm imbalances.

FIG. 6B is a graph of another example of obtaining error signals by sweeping different arm sub MZM imbalances. In an example shown in FIG. 6B, the error signals 660 may be obtained by determining the difference between the maxima at ϕ<0 and at ϕ>0, per FIG. 5.

Simulations have been carried out for several combinations of I and Q sub MZM arm imbalance and IQ angle for both proposed schemes shown in FIGS. 6A and 6B. One may conclude that a control loop designed around each of the described methods may achieve a minimization of the sub MZM arm imbalance in a nested MZM structure. One may also conclude that while measuring the tone amplitudes, payload data may be transmitted at significantly higher power.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, metal-oxide semiconductor field-effect transistors (MOSFETs), ASICs, FPGAs circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor that implements aspects of the embodiments.

The suitable processors may include circuitry to implement the methods provided herein. The circuitry may include receiving circuitry, processing circuitry and transmitting circuitry.

The methods and flow charts provided herein may be implemented in a computer program, software, or firmware incorporated in a non-transitory computer-readable storage medium for execution by a general purpose computer or a processor. Examples of non-transitory computer-readable storage media, include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Further, the devices according to various embodiments described herein may be interspersed among other devices depending on the functionality of the microelectronic device. In addition, the number and components of the devices may vary depending on the functionality of the microelectronic device. By way of example, the number of correlators may vary from two to dozens.

What is claimed is:

1. A method for monitoring and controlling arm imbalance in an optical transmitter, including a Mach-Zehnder Modulator (MZM) having an in-phase arm and a quadrature arm, the method comprising:
    receiving light by the MZM;
    supplying, by the MZM, a first portion of the light to the in-phase arm and a second portion of the light to the quadrature arm;
    applying a first RF signal carrying first data and a first dither signal to a first electrode coupled to the in-phase arm, such that the first portion of the light carries the first dither signal, a first modulator arm adjustment being applied to the first portion of the light;
    applying a second RF signal carrying second data and a second dither signal to a second electrode coupled to the quadrature arm, such that the second portion of the light carries the second dither signal, a second modulator arm adjustment being applied to the second portion of the light;
    combining the first and second portions of the light from the in-phase arm and the quadrature phase arm, respectively, into an optical output signal;
    tapping the optical output signal to provide a first portion of the optical output signal and transmitting a second portion of the optical output signal;
    obtaining one or more first error signals based on the first dither signal of the first portion of the output signal, and one or more second error signals based on the second dither signal of the first portion of the optical output signal; and
    determining a first change to the first modulator arm adjustment based on the one or more second error signals and a second change to the second modulator arm adjustment based on the one or more first error signals.

2. The method of claim 1, further comprising:
    detecting first characteristics of the obtained first error signals and second characteristics of the obtained second error signals; and
    determining the first change to the first modulator arm adjustment based on the detected second characteristics and the second change to the second modulator arm adjustment based on the detected first characteristics.

3. The method of claim 2, wherein the characteristics include at least one of a minimum, a maximum and a null, and are determined based on at least one of first order harmonics, second order harmonics and amplitude modulated (AM) frequencies.

4. The method of claim 1, wherein applying the first modulator arm adjustment includes applying the first change and applying the second modulator arm adjustment includes applying the second change.

5. The method of claim 4, wherein applying the first change and applying the second change are performed in a control loop.

6. The method of claim 1, wherein the first modulator arm adjustment is a first modulator arm phase adjustment.

7. The method of claim 1, wherein the second modulator arm adjustment is a second modulator arm phase adjustment.

8. The method of claim 1, wherein the first modulator arm adjustment is a first modulator arm amplitude adjustment.

9. The method of claim 1, wherein the second modulator arm adjustment is a second modulator arm amplitude adjustment.

10. The method of claim 1, wherein the first and second dither signals include AM dither tones.

11. An optical transmitter comprising:
    a Mach-Zehnder Modulator (MZM) that receives light, the MZM having an in-phase arm and a quadrature arm, and that supplies the light such that a first portion of the light is supplied to the in-phase arm and a second portion of the light is supplied to the quadrature arm;
    an electrical drive signal source, operatively coupled to the optical modulator, applying a first RF signal carrying first data and a first dither signal to a first electrode coupled to the in-phase arm, such that the first portion of the light carries the first dither signal, a first modulator arm adjustment being applied to the first portion of the light;

the electrical drive signal source applying a second RF signal carrying second data and a second dither signal to a second electrode coupled to the quadrature arm, such that the second portion of the light carries the second dither signal, a second modulator arm adjustment being applied to the second portion of the light;

the MZM combining the first and second portions of the light from the in-phase arm and the quadrature phase arm, respectively, into an optical output signal;

a splitter, operatively coupled to the MZM, having first and second outputs, the first output supplies a first portion of the optical output signal and the second output supplies a second portion of the optical output signal;

a first circuit, operatively coupled to the splitter, that obtains one or more first error signals based on the first dither signal of the first portion of the optical output signal and a second circuit, operatively coupled to the splitter, that obtains one or more second error signals based on the second dither signal of the first portion of the optical output signal;

a processor, operatively coupled to the first and the second circuits, that determines a first change to the first modulator arm adjustment based on the one or more second error signals and a second change to the second modulator arm adjustment based on the one or more first error signals.

12. The optical transmitter of claim 11, further comprising:

the processor detecting first characteristics of the obtained first error signals and second characteristics of the obtained second error signals; and the processor determining a first change to the first modulator arm adjustment based on the detected second characteristics and a second change to the second modulator arm adjustment based on the detected first characteristics.

13. The optical transmitter of claim 12, wherein the characteristics include at least one of a minimum, a maximum and a null, and are determined based on at least one of first order harmonics, second order harmonics and amplitude modulated (AM) frequencies.

14. The optical transmitter of claim 11, wherein the processor provides to the electrical drive signal source, the first change to first modulator arm adjustment and the second change to second modulator arm adjustment.

15. The optical transmitter of claim 11, wherein applying the first modulator arm adjustment includes applying the first change and applying the second modulator arm adjustment includes applying the second change.

16. The optical transmitter of claim 15, wherein applying the first change and applying the second change are performed in a control loop.

17. The optical transmitter of claim 11, wherein the first modulator arm adjustment is a first modulator arm phase adjustment.

18. The optical transmitter of claim 11, wherein the second modulator arm adjustment is a second modulator arm phase adjustment.

19. The optical transmitter of claim 11, wherein the first modulator arm adjustment is a first modulator arm amplitude adjustment.

20. The optical transmitter of claim 11, wherein the second modulator arm adjustment is a second modulator arm amplitude adjustment.

21. The optical transmitter of claim 11, wherein the first and second dither signals include AM dither tones.

22. The optical transmitter of claim 11, wherein the first modulator arm adjustment is a first modulator arm adjustment drive signal and the second modulator arm adjustment is a second modulator arm adjustment drive signal.

* * * * *